Figure 1:
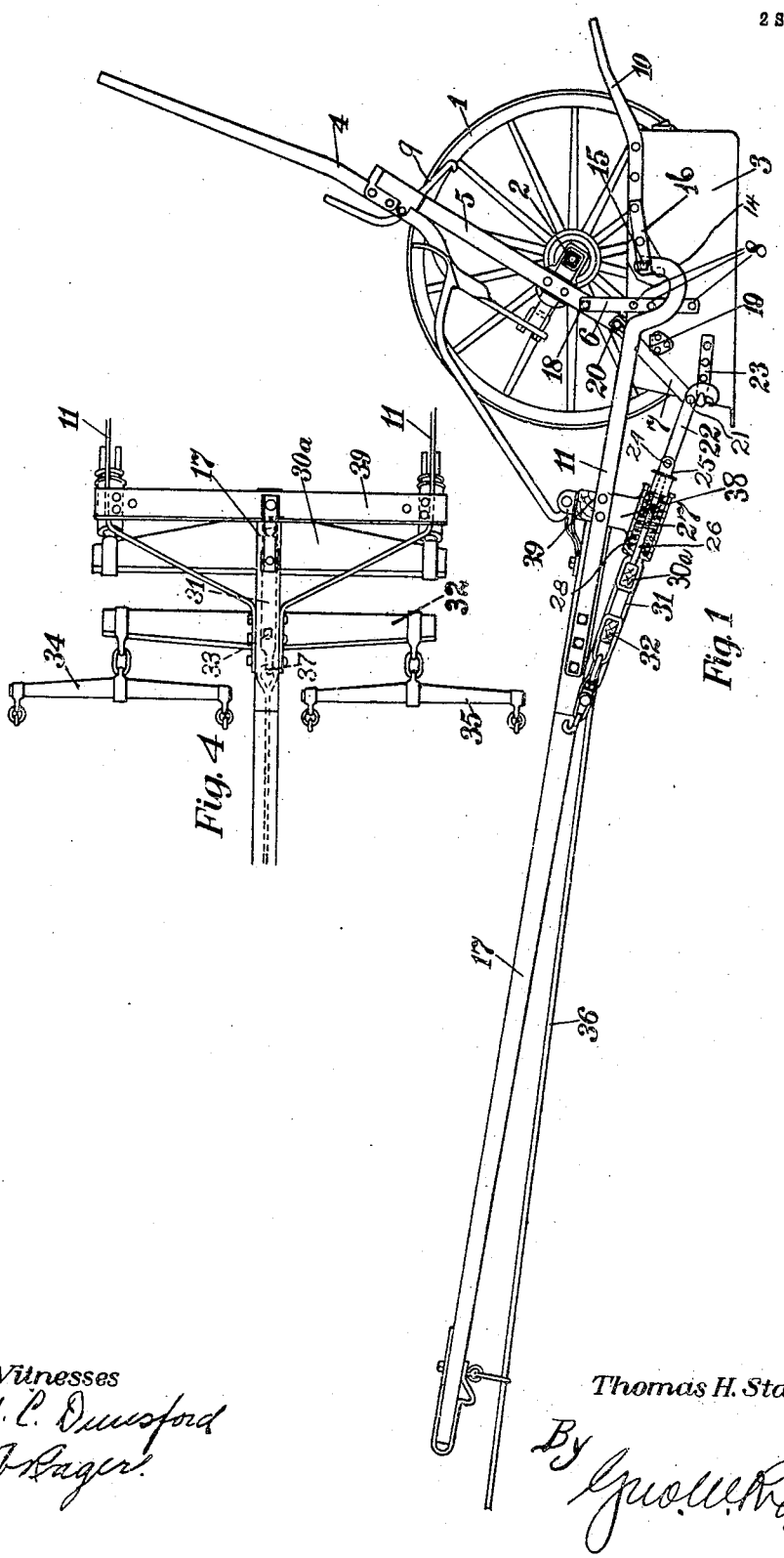

T. H. STAGG.
WHEELED SCRAPER.
APPLICATION FILED MAY 24, 1909.

960,052.

Patented May 31, 1910.
2 SHEETS—SHEET 2.

Witnesses
M. E. Dunsford
A. Rager

Thomas H. Stagg, Inventor
By Geo. W. Rightmire
Attorney

UNITED STATES PATENT OFFICE.

THOMAS H. STAGG, OF COLUMBUS, OHIO, ASSIGNOR TO THE KILBOURNE AND JACOBS MANUFACTURING COMPANY, OF COLUMBUS, OHIO, A CORPORATION OF OHIO.

WHEELED SCRAPER.

960,052. Specification of Letters Patent. Patented May 31, 1910.

Application filed May 24, 1909. Serial No. 498,069.

*To all whom it may concern:*

Be it known that I, THOMAS H. STAGG, a citizen of the United States, residing at Columbus, in the county of Franklin and State of Ohio, have invented certain new and useful Improvements in Wheeled Scrapers, of which the following is a specification.

My invention relates to improvements in draft construction for wheeled scrapers, and especially comprises an arrangement of devices which makes the draft in a direct line from the cutting edge of the scraper bowl to the shoulders of the horses, and contemplates also the introduction of a resilient member for the purpose of easing the pull upon the animals.

The invention further includes the provision of a pivot for the bowl at a point somewhat in rear of the axle of the scraper carriage.

It is a matter of experience that the usual present construction of the draft devices for wheeled scrapers is unsatisfactory for the reason that it exerts a downward pull on the necks of the draft animals, in some cases even bringing the animal to his knees; this effect is especially great when the bowl is tilted to load it, at which time the constant tendency of the forward end of the bowl is to go deeply into the earth and thereby exert a constantly increasing downward pull upon the neck of the draft animal. This tendency to pull downwardly is inseparable from the present construction of wheeled scrapers, and the life of the draft animal used in working such scraper is comparatively short. The usual construction is not only unduly wearing upon the animal but also produces galled surfaces on the neck, which periodically put the animal out of active use. In practice I have found that by employing my construction of scraper draft appliances and arrangements, the animal used can accomplish at least twenty-five per cent. more of work in the same time, and with less wearing effect. It is with a view of remedying the above defects in wheeled scraper constructions that I have been led to the present invention, which includes the elements above set forth and their combinations as will be hereinafter set out in detail.

I have shown a preferable form of my invention in the drawings attached hereto and hereby made a part of this specification, in which—

Figure 2:
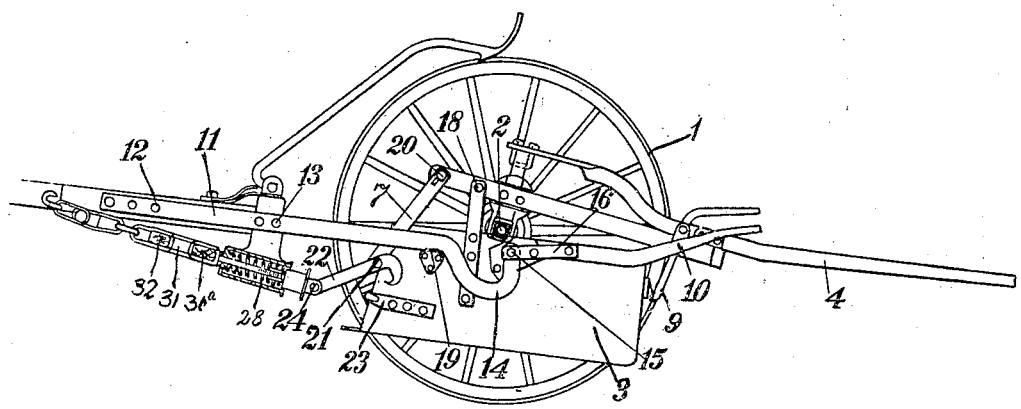
Figure 3:
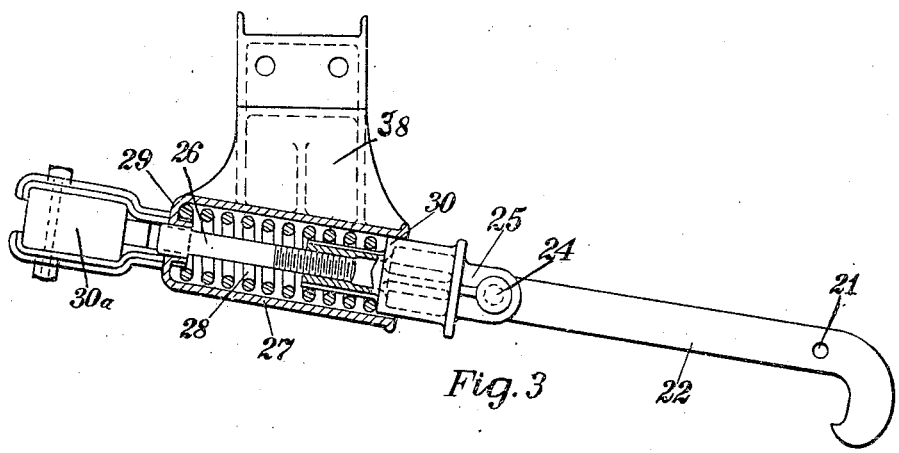

Figure 1 is a sectional elevation of a wheeled scraper containing my devices, in loading position; Fig. 2 is a sectional elevation showing the scraper loaded and the bowl lifted into position for carrying away the load; Fig. 3 is an enlarged detail of the spring and casing introduced into the draft construction; Fig. 4 is a top view of the tongue and draft appliances, showing the means of supporting the draft construction.

Referring to the drawings in which the same numeral indicates the same part throughout, 1 is a scraper wheel mounted on the axle 2; the bowl 3 is supported on the axle and is manipulated by the lever 4 and the bar 5 having the pivoted arms 6 and 7 thereon, the arm 6 being secured to the bowl 3 at the points 8; the latch 9 is adapted to engage the bowl and support the same at its rear end when in the position shown in Fig. 2. The scraper is controlled by the handles 10 in the usual way. The bar 11 is secured to the tongue at the points 12 and 13 and is formed with the neck or yoke 14 thereon, and connected pivotally at 15 with the scraper bowl 3 through the strap 16, the latter being secured to the handle 10 as shown.

The construction as thus far described does not depart from the normal construction in use at the present time with the exception that the pivot point 15 connecting the bar 11 with the scraper bowl is so located as to fall somewhat rearwardly of the axle 2; the advantage in this lies in the fact that the scraper when being lifted into its carrying position or being lowered into its loading position, and during the loading operation is more perfectly balanced than in the usual present construction. The balance is more evenly preserved for the reason that the pivot points 15 and 18 are arranged on opposite sides of the axle 2, and the vertical lines intersecting these pivot points are brought rather close together but at the same time are retained on opposite sides of the chief supporting member, namely, the axle. The lug 19 on the scraper bowl 3 engages the bar 11 as the bowl is lifted to its upper carrying position, and not only acts as a stop but also produces a steadying effect upon the bowl while the scraper is in motion.

The arm 7 pivoted at 20 on the bar 5 is at its other end pivotally connected at 21 with the hook member 22 adapted to engage the hook 23 secured upon the scraper bowl. The hook 22 is further pivotally connected at 24 with the head 25 of the rod 26 which passes through the casing 27 containing the spring 28; the spring encircles the rod 26, and at one end is in contact with the casing as shown at 29 and at its other end is adapted to engage the shoulder 30 formed on the rod 26. The rod 26 at its other end is connected to the bar 30ª, which in Fig. 4 is seen to be connected at its opposite ends to a draft member similar to that shown in Fig. 3. The bar 30ª is connected by means of the yoke 31 with the evener 32 through the pivot bolt 33, the draft animals being hitched to the swingle trees 34 and 35.

At 36 is shown the rod to the outer end of which a second team may be hitched, the draft being exerted through the rod 36 connected at 37 with the yoke 31, so that both teams exert a pull upon the bar 30ª, and therethrough upon the spring construction above described and consequently upon the scraper bowl through the hook members 22 and 23. The spring case 27 is supported by the plate 38 upon the bar 39 which is mounted upon the bars 11, at its ends, and at its middle point is mounted upon the tongue member 17. A conventional construction for the casing and its supporting plate 38 has been shown in the drawings, but the form of this part may be changed without departing from the spirit of my invention.

The spring 28 being in the direct line of draft and receiving the entire stress thrown upon the scraper, will ease the wear and strain upon the shoulders of the draft animals to a very great extent, and this is especially true when obstacles or uneven roads are encountered.

The draft appliances are so constructed and arranged as to lie in a direct line projected from the cutting edge of the scraper bowl to the point of greatest stress of the collar upon the shoulders of the draft animal; the point of connection with the scraper bowl is so fixed as to cause the bowl to move evenly and without any digging tendency into the material being loaded, and its advantage over present constructions is exactly the difference between a scraper bowl so mounted as to exert constant digging tendency when being loaded, and one that tends to move in a horizontal plane through the material. It is readily seen that the latter construction, which is the one I employ, will not tend to pull downwardly upon the necks of the animals, but will always cause the stress of the load to fall in an inclined line upon the shoulders of the animals, said line having the normal direction from the shoulders to the lowest point of the scraper.

The tongue, it is noted, is connected with the scraper bowl through the bars 11, at the pivot point 15, in rear of the axle; this feature has been pointed out as providing a construction which also tends to relieve the strain on the draft animals when dumping the load. In thus pivoting the bowl I provide for a long leverage when dumping; the lifting of the scraper to a dumping position, when the bowl is pivoted at a point nearer to its cutting edge, is a very difficult matter, and the farther removed the pivot point is from the edge within appropriate limits of scraper construction, the easier it will be to dump the same on account of the increased leverage made available for this purpose. Consequently, the draft animals accomplish the dumping of the scraper with less effort and strain upon themselves, and thereby their efficiency is increased and prolonged. The three features of my construction which I desire to emphasize are, therefore, the provision of draft appliances causing the pull to fall in a direct line from the cutting edge of the scraper bowl to the shoulders of the draft animals; the introduction of the resilient member in the direct line of draft appliances, and the connection of the tongue with the scraper bowl at a point somewhat in rear of the axle, whereby the strain on the draft animals is greatly relieved during the process of dumping the load.

The drawings illustrate and the description herewith applies to one embodiment of my invention, but I do not wish to be understood as confining myself to the specific construction shown, but desire to avail myself of all such modifications as fall within the scope of the appended claims.

What I claim is:

1. In a wheeled scraper, a bowl pivotally mounted thereon, draft appliances mounted on said scraper comprising hitching apparatus, pivoted hook members connected therewith, and means carried by said bowl with which said hook members are adapted to be engaged, said draft appliances being arranged to exert a pull in a direct line from the cutting edge of the bowl to the shoulders of the draft animals.

2. In a wheeled scraper, a pivotally mounted bowl, a tongue member, draft appliances mounted on said tongue member comprising hitching apparatus, pivoted hook members connected therewith, means carried by said bowl with which said hook members are adapted to be engaged, said draft appliances being arranged to exert a pull in a direct line from the cutting edge of the bowl to the shoulders of the draft animals, and bars rigidly connected with said tongue member at one end and to said bowl at its other end at a point somewhat beyond the axle of said scraper.

3. In a wheeled scraper, a bowl pivotally mounted thereon, a tongue member, bars rigidly connected with said tongue member at one end and with said bowl at its other end at a point beyond the axle of said scraper, draft appliances mounted on said tongue member comprising hitching devices, bar members associated therewith, hook members pivotally connected with said bar members, means carried by said bowl adjacent its cutting edge with which said hook members are adapted to be engaged, said draft appliances being arranged in a direct line from a point adjacent to the cutting edge of the bowl to the shoulders of the draft animals.

4. In a wheeled scraper, a pivotally mounted bowl, a tongue member, draft appliances mounted on said tongue member comprising hitching devices, bar members associated therewith, springs encircling said bar members, pivoted hook members connected with said bar members, and means carried by said bowl adjacent to its cutting edge with which said hook members are adapted to be engaged, said draft appliances being arranged in a direct line from a point adjacent to the cutting edge of the bowl to the shoulders of the draft animals.

5. In a wheeled scraper, a pivotally mounted bowl, a tongue member, draft appliances mounted on said tongue member comprising hitching devices, bar members associated therewith, springs encircling said bar members, a pivoted hook member connected with said bar members, and means carried by said bowl adjacent to its cutting edge with which said hook members are adapted to be engaged, said draft appliances being arranged in a direct line from a point adjacent to the cutting edge of the bowl to the shoulders of the draft animals, bars having rigid connection with said tongue member at one end and pivotal connection with said bowl at its other end at a point in said bowl on the side of the axle of said scraper opposite to that on which the tongue is located.

6. In a wheeled scraper, a pivotally mounted bowl, a tongue member, draft appliances mounted on said tongue member comprising hitching devices, bar members associated therewith, springs encircling said bar members, housings for said springs, pivoted hook members connected with said bar members, and means carried by said bowl adjacent to its cutting edge with which said hook members are adapted to be engaged, said draft appliances being arranged in a direct line from a point adjacent to the cutting edge of the bowl to the shoulders of the draft animals.

In testimony whereof I affix my signature in the presence of two witnesses.

THOMAS H. STAGG.

Witnesses:
A. RAGER,
HORACE S. LEW.